(12) United States Patent
Ohashi

(10) Patent No.: US 6,908,683 B2
(45) Date of Patent: Jun. 21, 2005

(54) PEELING MEMBER

(75) Inventor: Masaaki Ohashi, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/940,773

(22) Filed: Aug. 28, 2001

(65) Prior Publication Data

US 2002/0031648 A1 Mar. 14, 2002

(30) Foreign Application Priority Data

Sep. 11, 2000 (JP) .................................... P2000-275569

(51) Int. Cl.$^7$ .................. G03G 15/20; B65H 29/54
(52) U.S. Cl. .................. 428/450; 428/354; 428/421; 428/422; 428/447; 428/448; 428/457; 156/73.5
(58) Field of Search ................ 428/421, 422, 428/457, 447, 450, 354, 448; 156/73.5

(56) References Cited

U.S. PATENT DOCUMENTS 4,144,110 A * 3/1979 Luc ........................ 156/73.5
5,216,069 A * 6/1993 Kobori ..................... 524/588
5,441,811 A * 8/1995 Lin et al. .................. 428/355
6,236,829 B1 * 5/2001 Uehara et al. ............. 399/323
2002/0031648 A1 * 3/2002 Ohashi ..................... 428/196

FOREIGN PATENT DOCUMENTS

JP 59-188681 10/1984
JP 11-184300 7/1999

OTHER PUBLICATIONS

JP Patent Abstracts Pub 11–184 300 entire document translation, Jul. 1999.*

* cited by examiner

Primary Examiner—Daniel Zirker
(74) Attorney, Agent, or Firm—Hedman & Costigan, P.C.

(57) ABSTRACT

A peeling member for peeling a paper from a various types of rollers installed in an electrophotographic apparatus such as a copy machine and a laser beam printer is described. The peeling member comprises a peeling sheet, and a support member for supporting the peeling sheet, and the support member is adhered to the peeling sheet with laser spot welding. The peeling member suppresses waving of the peeling sheet, and adheres the peeling sheet with the support member uniformly.

5 Claims, 3 Drawing Sheets

PEELING MEMBER

BACKGROUND OF THE INVENTION

1. Field of the Invention

The present invention relates to a peeling member for peeling a paper from a various types of rollers installed in an electrophotographic apparatus such as a copy machine and a laser beam printer. More particularly, the present invention relates to a peeling member for use with a fixing roller required to have heat resistance.

2. Discussion of Background

Typically, electrophotographic apparatuses such as a copy machine and a laser beam printer comprise a various types of rollers for developing electrostatic latent images formed on a photosensitive drum on a paper with a developer, and then fixing them. The developing part has the photosensitive drum and a roller for applying oil, which is not applicable to a dry-laid electrophotographic apparatus. The fixing part has a fixing roller and a pressure roller.

Conventionally, separation pawls are disposed on the photosensitive drum, and the fixing and pressure rollers to prevent the paper from winding the roller, which retards a smooth action. The separation pawls pick up a rim of the paper in a way that tips of the pawls are contacted with and rub an outer surface of the roller to prevent the paper from winding the roller.

A contact width of the separation pawls and the roller is about 1 to 10 mm. One roller generally has 4 to 16 separation pawls. Since the separation pawls contact locally with the roller, the roller is partially abraded, whereby no excellent image can be obtained. In addition, since the separation pawls also contact locally with the paper, the developer transferred to the paper is easily scraped off, and the developer scraped off is deposited on the separation pawls to contaminate the paper.

To address such problems, Japanese Laid-Open Patent Publication No. 59-188681 proposes a paper peeling apparatus capable of line-contacting with the roller.

Japanese Laid-Open Patent Publication No. 11-184300 proposes a peeling sheet obtained by laminating a heat-resistant plastic sheet or a metal sheet as a support with a fluororesin on one surface thereof, and folding it such that the fluororesin is to be outside.

When the support is the metal sheet, in many cases, the peeling sheet is adhered to the support member with an adhesive.

However, when the peeling sheet is adhered to the support with the adhesive, the peeling sheet is stripped off from the support under high temperature and for a long time, or a temperature cycle which increases and decreases the temperature repeatedly. Furthermore, it is difficult to coat the adhesive uniformly, and adhesion is different on portions. The peeling sheet is partially stripped off and waved. As a result, the peeling sheet becomes useless, and the paper cannot be peeled.

The paper peeling apparatus described in Japanese Laid-Open Patent Publication No. 59-188681 comprises a metal base plate, and a plastic plate, i.e., a fluororesin, having a thickness of 0.05 mm or more secured and support on the base plate. A tip of the plastic plate protruded slightly from the metal base plate is line-contacted with the fixing roller. The tip of the plastic plate is stripped off by plastic deformation, thus paper peeling ability is decreased.

The laminate obtained by folding the support with a fluororesin on one surface thereof such that the fluororesin is to be outside, described in Japanese Laid-open Patent Publication No. 11-184300, has the problem that curvature increases at cross-section of a contact surface of the fixing roller.

In recent years, the developer, i.e., a toner, for use in the electphophotograhic apparatus shifts to include a highly transparent polyester-based binder resin to improve color development. The toner including such polyester-based binder resin is extremely tackiness. If such toner is used in the paper peeling apparatus described in Japanese Laid-Open Patent Publication No. 59-188681, the toner is deposited on the metal base plate, and an adhered portion of the metal base plate and the plastic plate. If such toner is used in the peeling sheet described in Japanese Laid-Open Patent Publication No. 11-184300, it becomes difficult to line-contact with the fixing roller, and to peel off the paper.

SUMMARY OF THE INVENTION

An object of the present invention is to suppress waving of the peeling sheet, and to adhere the peeling sheet with the support member uniformly.

Another object of the present invention is to provide a peeling sheet capable of fully line-contacting with a roller, and not damaging to the roller at a contact portion.

Yet another object of the present invention is to provide a peeling member capable of providing excellent paper peeling ability for a long period of time, even if the toner having extremely high tackiness is used.

According to the present invention, a peeling sheet for peeling a paper from a roller attached to an electrophotographic apparatus comprises a metal plate, and a fluororesin film adhered to a portion where the metal plate is at least contacted or adjacent with/to the roller with a silicone based adhesive.

According to the present invention, a peeling member comprises a support member, and a peeling sheet for peeling a paper from a roller attached to an electrophotographic apparatus; the peeling sheet being adhered to the support member with laser spot welding.

By adhering the peeling sheet with the support member using the laser spot welding, adhesion is thermally stabilized, and adhesion difference on portions is overcome. Moreover, the peeling sheet does not stripped off, and does not wave. Thus, the peeling member of the present invention can peel the paper smoothly.

When the metal plate contacted or adjacent with/to the roller has a thickness of 300 $\mu$m or less, and a fluororesin film is adhered to the metal plate, a tip of the metal plate will not be stripped off by plastic deformation. When the predetermined fluororesin film and silicone based adhesive are used and a surface treatment such as etching is subjected thereto, excellent adhesion and durability can be obtained.

DESCRIPTION OF THE PREFERRED EMBODIMENTS

Figure 1:
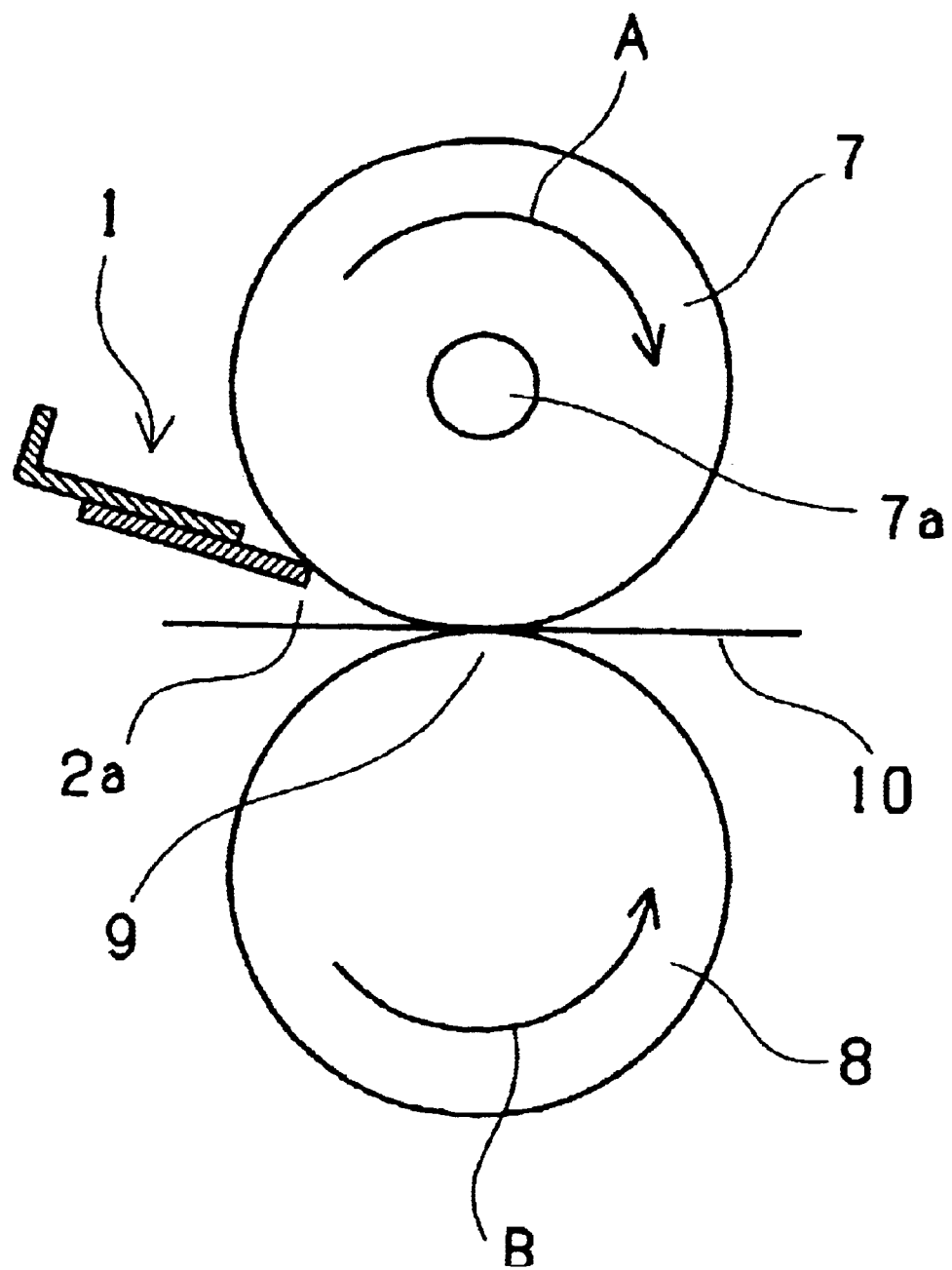
FIG. 1 is a schematic cross-sectional view of a fixing apparatus using a peeling member.

Referring to FIG. 1, a fixing apparatus using the peeling member of the present invention will be explained.

The fixing apparatus is composed of a fixing roller 7 including a built-in heater 7a rotating in a direction A designated by an arrow, a pressure roller 8 rotating in a direction B designated by an arrow coupled driving and in contact with the fixing roller 7, and a peeling member 1 disposed around a nip 9 formed by contacting the fixing roller 7 and the pressure roller 8. A tip 2a of a peeling sheet constituting the peeling member 1 is disposed in contact or adjacent with/to the fixing roller 7 so as to peel a paper 10 passed through the nip 9 from the fixing roller 7.

The "contact with the roller" herein means that a side of the peeling sheet is line-contacted with the roller along an axis direction thereof. The "adjacent" herein means that the side of the peeling sheet is disposed near the roller so that it prevents the paper from winding around the roller.

Figure 2:
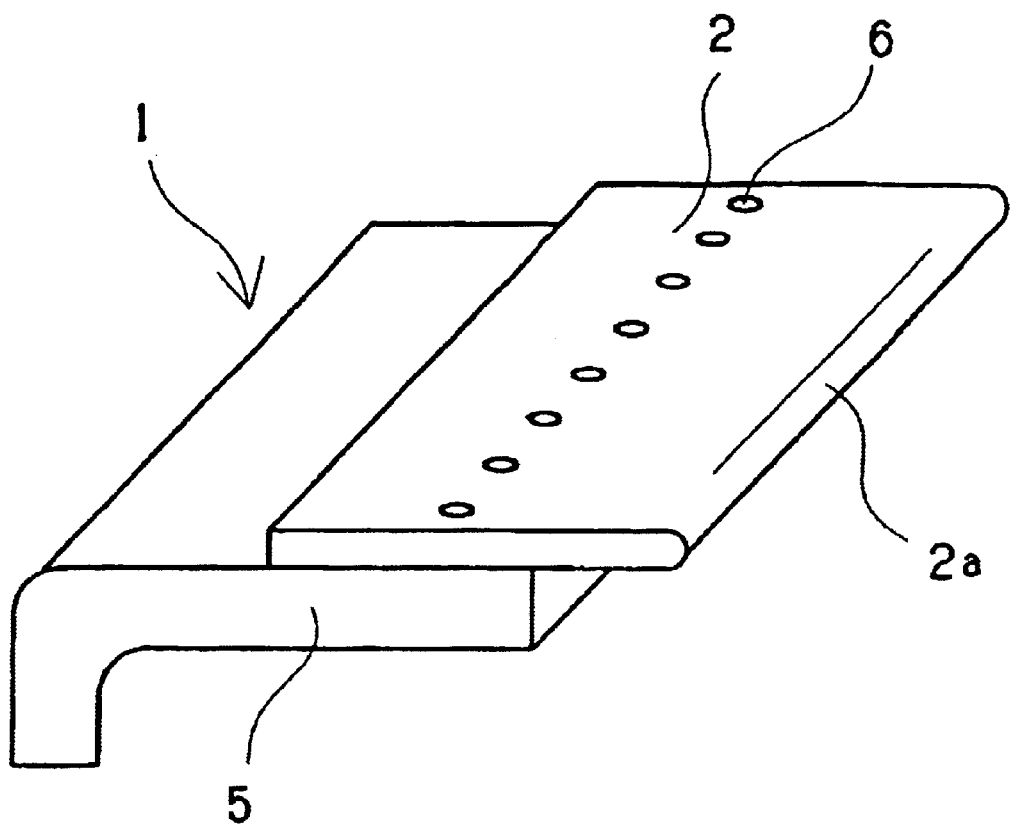
FIG. 2 is a partly enlarged perspective view of a peeling member showing a peeling sheet above.

Referring to FIG. 2, an example of the peeling member is explained. FIG. 2 is a partly enlarged perspective view of a peeling member showing a peeling sheet above.

A peeling member 1 comprises a support member 5 and a peeling sheet 2 that are adhered by a laser spot welding at spots 6. It is preferable that a plurality of the spots 6 be formed in parallel with a side contacted or adjacent with/to the roller in order to suppress waving of the peeling sheet 2. Also, it is preferable that a space between the spots 6 be narrow as long as the laser spot welding can be conducted. Specifically, when the peeling sheet 2 having a contact width of about 300 mm is used, the space between the spots 6 is preferably about 10 mm.

The laser for use in the laser spot welding include a solid state laser that can weld and process metals, for example, a YAG laser and a ruby laser. The YAG laser is for fine working, and therefore is suitable for use in the present invention. The YAG laser is produced by exciting artificial crystal comprising yttrium, aluminum and garnet to which an active ion $Nd^{3+}$ contributing to laser oscillation is added. The YAG laser is commercially available by Miyachi Technos Corp under the tradename of Pulse YAG Laser Welding Machine.

Both of the support member 5 and the peeling sheet 2 are preferably made by a metal plate capable of being applied the laser spot welding.

Examples of a material of the metal plate constituting the peeling sheet 2 include iron, aluminum, copper, stainless steel and the like. Preferably, the metal plate has a thickness within the range of 50 to 300 $\mu$m. If the thickness of the metal plate is less than 50 $\mu$m, it cannot provide sufficient pressure welding to the roller to ensure peeling ability. If the thickness exceeds 300 $\mu$m, the paper to be peeled may bump against the tip of the peeling sheet 2, which may cause jamming.

In order to improve paper peeling ability, it is preferable that the tip 2a of the peeling sheet 2 be coated or adhered with/to a lubricant coating. It is especially preferable that a fluororesin film be adhered to the tip since such film has excellent paper peeling ability and durability to high temperature.

Figure 3:
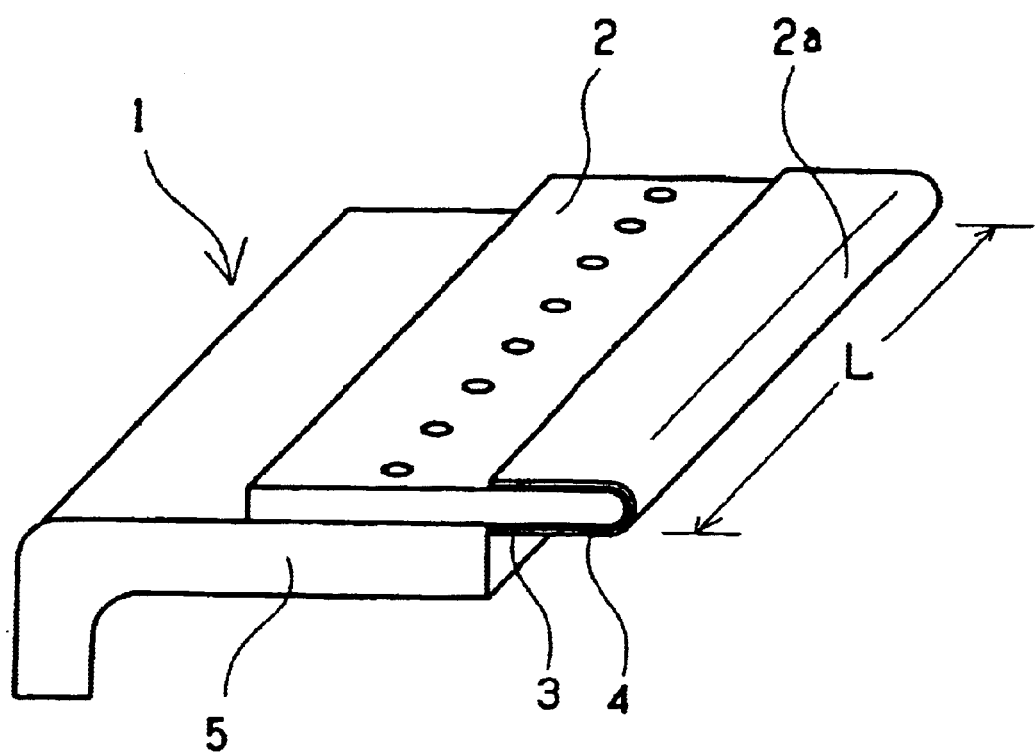
FIG. 3 is a partly enlarged perspective view of a peeling member where a resin film is adhered to the peeling sheet.

As shown in FIG. 3, a fluororesin film 4 is adhered to the tip 2a of the peeling sheet 2 contacted or adjacent with/to the roller using a silicon based adhesive 3.

The peeling sheet 2 has a contact width (L) that is almost the same length with the length of the roller in the axis direction. Increased contact width decreases a contact pressure against the roller per unit area, thereby preventing local abrasion of a roller surface. The "almost the same length with the length of the roller in the axis direction" is herein meant to express the width that can provide the aforementioned effect. Specifically, the width is equal or greater than the half of the length of the roller in the axis direction. Preferably, the width has the same or slightly longer as/than the length of the roller in the axis direction.

The fluororesin film 4 has preferably a thickness within the range of 10 to 200 $\mu$m, more preferably with in the range of 40 to 80 $\mu$m. If the thickness of the fluororesin film is less than 10 $\mu$m, the film may be broken by abrasion with the developer, and the thin metal plate may be exposed by slight wearing. Also, the film may be crumpled at a step of adhering it to the thin metal plate, and may be handled with difficulty. If the thickness exceeds 200 $\mu$m, the paper peeling ability is decreased.

Examples of a material for use in the fluororesin film 4 include known fluororesin films such as polytetrafluoroethylene polymer (hereinafter referred to as "PTFE"), tetrafluoroethylene-perfluoroalkylvinylether copolymer (hereinafter referred to as "PFA"), tetrafluoroethylene-hexafluoropropylene copolymer (hereinafter referred to as "FEP"), tetrafluoroethylene-ethylene copolymer (hereinafter referred to as "ETFE"), polychlorotrifluoroethylene, chlorotrifluoroethylene-ethylene copolymer, polyvinylidene fluoride, polyvinyl fluoride, and tetrafluoroethylene-hexafluororpropylene-perfluoroalkylvinylether copolymer.

Among the fluororesin film described above, the film comprising PTFE, PFA, FEP, or ETFE is suitable for use in the peeling member of the present invention, since such film has excellent anti-tacking property to the developer, and sufficient heat-resistance. When the fluororesin film is formed using a fluororesin into which carbon micropowder such as ketchen black and acetylene black is blended, it can prevent a decreased in the paper peeling ability due to static electricity.

Preferably, the fluororesin film is surface-treated for adhering to the metal plate. The "surface treatment" herein is a treatment to improve adhesion effectiveness, when the fluororesin film is adhered to the metal plate with a silicone based adhesive described later. Examples include corona discharge, sputter etching, plasma etching, TOS treatment with metal sodium, and ultraviolet ray irradiation.

The silicone based adhesive for use in the present invention include an adhesive prepared by condensing a copolymer comprising $SiO_2$ unit and $(CH_3)_3SiO$ unit, and diorganopolysiloxane crude rubber. The silicone based adhesive can strongly adhere the fluororesin film with the metal plate.

It is especially noticeable that the adhesion can be maintained at a fixing temperature. The adhesive layer can be thin, and the thickness of the peeling sheet may not be too thick to damage the peeling ability. The silicone based adhesive layer may have a thickness within the range of 5 to 50 μm. If the thickness of the silicone based adhesive layer is less than 5 μm, adhesion becomes insufficient. If the thickness exceeds 50 μm, the peeling sheet becomes thick correspondingly, resulting in decreased paper peeling ability.

The peeling member of the present invention can be used for peeling the paper from various types of rollers installed in the electrophotographic apparatus. The peeling member is suitably used with a fixing roller required to have heat resistance.

EXAMPLE 1

A peeling sheet, a stainless steel plate (SUS304CSP) having a thickness of 200 μm, a length (L) of 300 mm and a width of 40 mm was adhered to a metal support made of the same stainless steel having a thickness of 1 mm, a length of 300 mm, and a width of 60 mm by subjecting YAG laser spot welding with a spot diameter of 0.5 mm, and a spot space of 5 mm, to form a peeling member. The peeling member was left at high temperature of 190° C. and a low temperature of −20° C. every 2 hours alternatively for 100 times. The peeling sheet was not striped off from the metal support, and was not wave.

EXAMPLE 2

A peeling sheet was prepared by cutting a stainless steel plate (SUS304CSP) having a thickness of 100 μm into a piece of 300 mm in length, i.e., a contact width (L) and 40 mm in width. Burrs produced on a cut surface of the peeling sheet were carefully removed. The corner of the peeling sheet that is contact with the roller was rounded to have radius of curvature of about 0.01 mm to 0.03 mm.

The peeling sheet was adhered to a metal support having a thickness of 1 mm, a length of 300 mm, and a width of 60 mm by subjecting YAG laser spot welding with a spot diameter of 0.5 mm, and a spot space of 5 mm, to form a peeling member.

Then, a fluororesin film was adhered to a tip of the peeling sheet. The fluororesin film was prepared by immersing a PTFE film having a thickness of 50 μm (Bearee FL3090 manufactured by NTN engineering plastics corporation) in an ammonium solution of metal sodium to subject etching for a surface of adhering to the thin metal plate.

On the etched surface of the fluororesin film, a silicone based adhesive solution containing dimethylpolysiloxane crude rubber (KR101 manufactured by Shin-Etsu Chemical Co., Ltd.) was coated uniformly, heated and dried at 120 to 200° C. After natural cooling to room temperature, a silicone based adhesive layer having a thickness of about 30 μm was formed.

The fluororesin film was disposed on a smooth board so that the adhesive layer faced up and it was not crumpled. Then the peeling sheet was chamfered, and fully degreased with petroleum benzine. At a center portion of the fluororesin film, a roller contact portion where a corner was rounded was disposed. The film was adhered to the surface of the peeling sheet using the roller contact portion as a boundary.

Thus, it was provided the peeling member comprising the peeling sheet where the fluororesin film was adhered to the roller contact portion and a back surface with the silicone based adhesive. The peeling sheet had a total thickness of 230 μm.

The peeling member was set at a fixing portion of a copying machine for testing at a fixing temperature of 190° C., and at a copy speed for A4-sized paper of 57 sheets per min. A copying test was conducted using an original with line charts having an image ratio of 30%, and A4-sized normal copy papers. Six sets of 5,000 A4-sized copy papers, that is 30,000 papers, were printed continuously. The copy machine was stopped every 5,000 papers to visually inspect quality of the printed image, and the peeling member was removed from the fixing portion to inspect wear of the fluororesin, deposition of the toner, and wear of the fixing roller.

As a result of the test, the printed image quality was not decreased using the peeling member in Example 2 after 30,000 copies were made. After completion of the test, the fluororesin film was not damaged, the toner was not deposited on the peeling sheet, and the fixing roller was not worn.

COMPARATIVE EXAMPLE 1

The peeling sheet and the metal support, both were used in Example 1 were adhered using a silicone rubber adhesive RTV-KE1800ABC manufactured by Shin-Etsu Chemical Co., Ltd. The same evaluation test was conducted as Example 1. As a result, the whole adherent part of peeling sheet was striped off.

COMPARATIVE EXAMPLE 2

The same thin metal plate was prepared as Example 2. The PTFE film having a thickness of 50 μm (Bearee FL3090 manufactured by NTN engineering plastics corporation) was secured and supported to/by the thin metal plate such that a 0.5 mm of the PTFE film was protruded from a side of the thin metal plate, and one edge of the PTFE film was a free end.

The peeling sheet was set at the copy machine used in Example 2. Similar to Example 2, the copying test was conducted by printing continuously.

As a result of the test, it was observed that the toner was deposited on the thin metal plate after 10,000 copies were made. However, the printed image quality was not decreased. The test was continued. After 15,000 copies were made, it was observed that the plastic plate was deformed, and the printed image quality was decreased. Accordingly, the test was discontinued.

COMPARATIVE EXAMPLE 3

The procedure for preparing the peeling sheet in Example 2 was repeated except that the fluororesin film was replaced with a PTFE film (Nitofron adhesive tape manufactured by Nitto Denko Corporation) with an acrylic based adhesive.

The peeling sheet was set at the copy machine used in Example 2. Similar to Example 2, the copying test was conducted by printing continuously.

As a result of the test, the printed image quality was not decreased using the peeling sheet in Comparative Example 3 after 5,000 copies were made. After about 9,000 copies were made, jamming occurred. It was observed that the fluororesin film was stripped off from the thin metal plate, and the toner was entered into the gap between the film and the thin metal plate.

The peeling sheet of the present invention comprises a metal plate, and a fluororesin film adhered to a portion where the metal plate is at least contacted or adjacent with/to the roller with a silicone based adhesive, whereby all of excellent paper peeling ability, high temperature resistance, and toner anti-tackiness are provided.

According to the present invention, the fluororesin film is made from the predetermined fluororesin to further improve toner anti-tackiness.

In addition, the surface of the fluororesin film is etched to improve adhesion between the fluororesin film and the silicone based adhesive. As a result, the fluororesin film is hard to be stripped off from the metal plate.

The silicone based adhesive contains dimethylpolysiloxane. Accordingly, the fluororesin film can be strongly adhered to the thin metal plate. Even if the peeling sheet is constantly subjected to high temperature such as a fixing temperature, the fluororesin film will not be stripped off.

In the peeling member of the present invention, the peeling sheet is adhered to the support member using the laser spot welding, whereby adhesion is thermally stabilized, and adhesion difference on portions is overcome. Accordingly, the peeling sheet does not stripped off, and does not wave. Thus, the peeling member of the present invention can peel the paper smoothly.

What is claimed is:

1. A peeling member arranged in contact with or adjacent to a roller attached to an electrophotographic apparatus, said peeling member consisting essentially of a metal support member, and a peeling sheet adhered to said metal support member with YAG laser spot welding, said peeling sheet consisting essentially of a metal plate and a polytetrafluoroethylene film adhered thereto with a silicone based adhesive at an end portion of the metal plate to form a polytetrafluoroethylene film tipped metal plate having a polytetrafluoroethylene tipped portion, said polytetrafluoroethylene tipped portion being the portion that contacts or is adjacent to the roller.

2. The peeling member as claimed in claim 1, wherein the polytetrafluoroethylene film has a thickness of 10 $\mu$m to 200 $\mu$m.

3. The peeling member as claimed in claim 1, wherein a surface of the polytetrafluoroethylene film for adhering to the peeling sheet is surface-treated.

4. The peeling member as claimed in claim 3, wherein the surface of the polytetrafluoroethylene film is etched by immersing the film in an ammonia solution of metal sodium.

5. The peeling member as claimed in claim 1, wherein the silicone based adhesive comprises dimethylpolysiloxane crude rubber.

* * * * *